US009709436B2

(12) United States Patent
Johnson

(10) Patent No.: US 9,709,436 B2
(45) Date of Patent: *Jul. 18, 2017

(54) LOAD CELL THAT IS SYMMETRICAL ABOUT A CENTRAL VERTICAL AXIS

(71) Applicant: ILLINOIS TOOL WORKS INC., Glenview, IL (US)

(72) Inventor: Thomas H. Johnson, Winnebago, MN (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 206 days.

This patent is subject to a terminal disclaimer.

(21) Appl. No.: 13/839,664

(22) Filed: Mar. 15, 2013

(65) Prior Publication Data
US 2014/0262557 A1 Sep. 18, 2014

(51) Int. Cl.
G01G 3/14 (2006.01)
G01G 21/08 (2006.01)
G01G 23/00 (2006.01)

(52) U.S. Cl.
CPC .......... G01G 3/14 (2013.01); G01G 3/1412 (2013.01); *G01G 21/08* (2013.01); *G01G 23/002* (2013.01); *G01G 23/005* (2013.01)

(58) Field of Classification Search
CPC ........ G01G 3/14; G01G 3/1414; G01G 21/08; G01G 3/1416; G01G 3/1418; G01G 3/12; G01G 3/1412; G01G 23/005; G01G 23/002; G01L 1/2243; Y10S 177/09
USPC ..................... 177/211, 229, 238–244, DIG. 9
See application file for complete search history.

(56) References Cited

U.S. PATENT DOCUMENTS

| 419,678 A | 1/1890 | Hutchinson |
| 663,300 A | 12/1899 | Rigby |
| 2,866,059 A * | 12/1958 | Laimins ............................ 338/5 |
| 3,439,761 A * | 4/1969 | Laimins ........................ 177/211 |
| 3,602,866 A * | 8/1971 | Saxl .............................. 177/211 |
| 3,706,349 A | 12/1972 | Paelian et al. |
| 3,924,729 A * | 12/1975 | Flinth .................. G01G 11/003 177/16 |
| 3,994,161 A | 11/1976 | Trozera |
| 4,020,686 A * | 5/1977 | Brendel ........................ 177/211 |
| 4,065,962 A | 1/1978 | Shoberg |
| 4,107,985 A | 8/1978 | Sommer |
| 4,114,708 A * | 9/1978 | Saner ................... G01G 11/003 177/145 |
| 4,181,011 A | 1/1980 | Brendel |

(Continued)

FOREIGN PATENT DOCUMENTS

EP 0164862 B1 10/1989
EP 0616199 B1 11/1996

(Continued)

OTHER PUBLICATIONS

Anthony, "CB17 Series," StrainSense Limited, Mar. 28, 2006, 3 pages.
ISR and WO for PCT/US2014/019991 mailed May 21, 2014.

Primary Examiner — Randy Gibson
(74) Attorney, Agent, or Firm — Hauptman Ham, LLP

(57) ABSTRACT

The invention relates to a load cell symmetrical about a central vertical axis and comprising first and second mounting surfaces, each on the same horizontal plane and configured for attachment to a support structure and to a loading fixture respectively.

32 Claims, 3 Drawing Sheets

(56) References Cited

U.S. PATENT DOCUMENTS

| | | | |
|---|---|---|---|
| 4,237,989 A | 12/1980 | Lewis | |
| 4,325,048 A * | 4/1982 | Zaghi et al. | 338/3 |
| 4,343,197 A | 8/1982 | Suzuki et al. | |
| 4,364,279 A * | 12/1982 | Stern et al. | 73/862.622 |
| 4,367,801 A | 1/1983 | Bryan | |
| 4,411,327 A * | 10/1983 | Lockery et al. | 177/211 |
| 4,432,247 A * | 2/1984 | Takeno | G01L 1/2206 338/2 |
| 4,485,881 A | 12/1984 | Tramposch et al. | |
| 4,488,611 A | 12/1984 | Jacobson | |
| 4,561,512 A | 12/1985 | Tramposch | |
| 4,583,607 A * | 4/1986 | Freeman | 177/244 |
| 4,700,656 A * | 10/1987 | Cone et al. | 177/245 |
| 4,718,287 A * | 1/1988 | Mishliborsky | G01L 1/2243 177/211 |
| 4,751,849 A | 6/1988 | Paros et al. | |
| 4,765,423 A * | 8/1988 | Karpa | 177/211 |
| 4,838,369 A | 6/1989 | Albert | |
| 4,898,255 A | 2/1990 | Gaines | |
| 4,951,027 A | 8/1990 | Kitagawa et al. | |
| 4,986,376 A * | 1/1991 | Cone | 177/128 |
| 5,052,505 A | 10/1991 | Nishide et al. | |
| 5,076,376 A * | 12/1991 | Bizet | G01G 3/1412 177/211 |
| 5,111,896 A * | 5/1992 | Porcari et al. | 177/16 |
| 5,154,247 A | 10/1992 | Nishimura et al. | |
| 5,190,117 A * | 3/1993 | Freeman | G01G 23/005 177/211 |
| 5,205,369 A * | 4/1993 | Neeleman | 177/229 |
| 5,220,971 A | 6/1993 | Farr | |
| 5,250,762 A * | 10/1993 | Gustafsson et al. | 177/244 |
| 5,294,756 A * | 3/1994 | Lauber et al. | 177/119 |
| 5,313,023 A | 5/1994 | Johnson | |
| 5,319,161 A * | 6/1994 | Miller | G01G 23/005 177/154 |
| 5,336,854 A | 8/1994 | Johnson | |
| 5,391,844 A * | 2/1995 | Johnson | G01G 3/1412 177/210 FP |
| 5,459,289 A * | 10/1995 | Burkhard | 177/244 |
| 5,481,072 A | 1/1996 | Ford | |
| 5,600,104 A * | 2/1997 | McCauley et al. | 177/136 |
| 5,604,336 A * | 2/1997 | Johnson | G01G 3/1412 177/229 |
| 5,723,826 A | 3/1998 | Kitagawa et al. | |
| 5,742,011 A | 4/1998 | Imai et al. | |
| 5,929,390 A * | 7/1999 | Naito et al. | 177/211 |
| 6,143,993 A | 11/2000 | Andersson | |
| 6,340,799 B1 * | 1/2002 | Hama et al. | 177/238 |
| 6,495,774 B1 * | 12/2002 | Pederson | 177/136 |
| 6,693,244 B2 * | 2/2004 | Johnson et al. | 177/126 |
| 6,755,087 B2 | 6/2004 | Clegg | |
| 6,787,713 B2 * | 9/2004 | Kuechenmeister et al. | 177/132 |
| 6,832,528 B2 | 12/2004 | Selig et al. | |
| 7,040,178 B1 * | 5/2006 | Perkins | G01G 23/005 73/856 |
| 7,076,990 B2 | 7/2006 | Yoshikuwa | |
| 7,347,109 B2 | 3/2008 | Yoshikuwa | |
| 7,371,978 B2 * | 5/2008 | Leahy | G01G 21/23 177/238 |
| 7,538,281 B2 * | 5/2009 | Pottebaum et al. | 177/211 |
| 7,958,790 B2 | 6/2011 | Gleghorn et al. | |
| 9,046,434 B2 * | 6/2015 | Nagai | G01G 23/005 |
| 9,400,207 B2 * | 7/2016 | Johnson | G01G 21/08 |
| 2003/0209086 A1 | 11/2003 | Schurr et al. | |
| 2006/0107754 A1 | 5/2006 | Perkins | |
| 2006/0169063 A1 * | 8/2006 | Loher et al. | 73/862.626 |
| 2014/0262555 A1 * | 9/2014 | Johnson | F16M 13/02 177/154 |
| 2014/0262556 A1 * | 9/2014 | Johnson | G01G 21/08 177/154 |

FOREIGN PATENT DOCUMENTS

| | | |
|---|---|---|
| EP | 0534226 B1 | 12/1996 |
| EP | 1345015 A2 | 9/2003 |
| EP | 1659378 A2 | 5/2006 |
| JP | H0933366 A | 2/1997 |

* cited by examiner

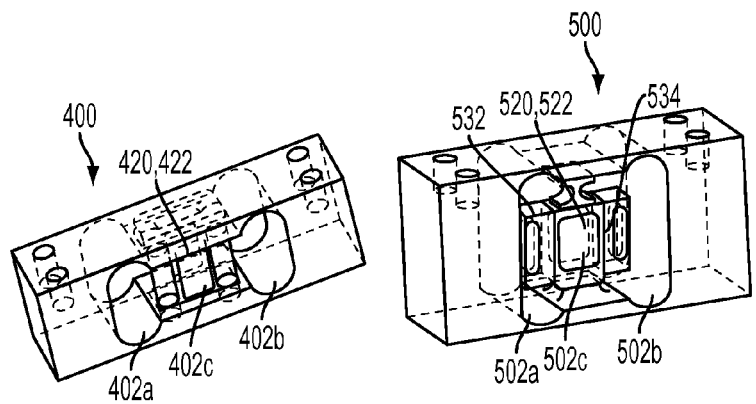
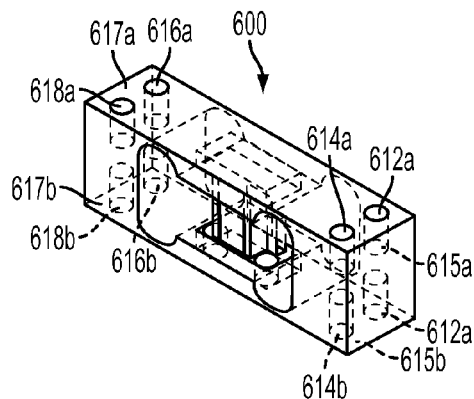
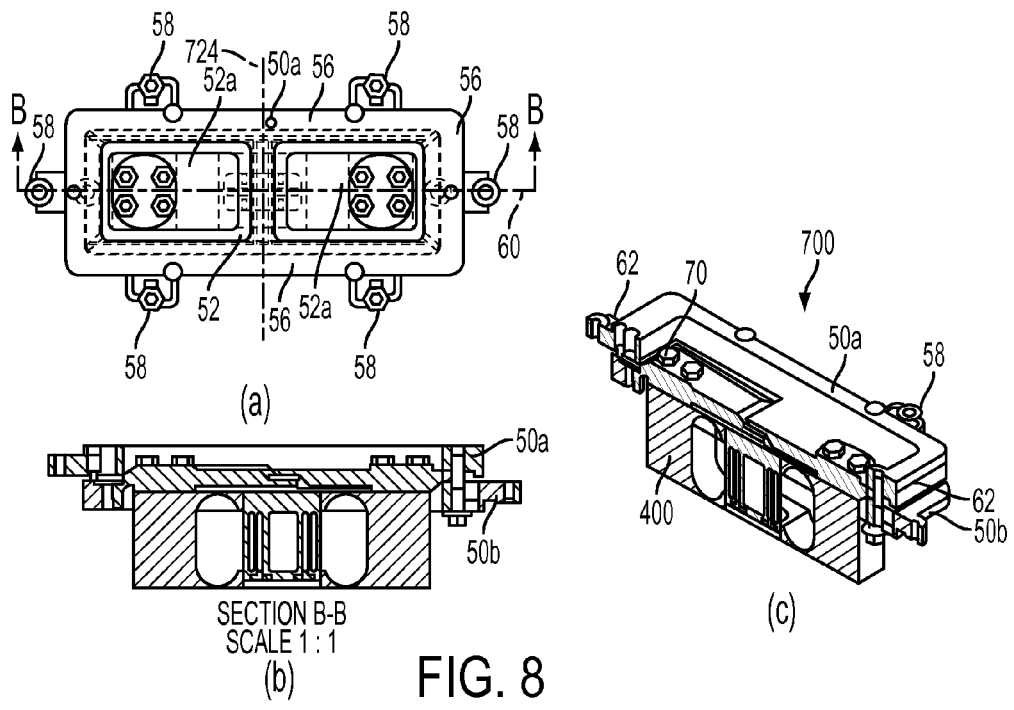
FIG. 6
FIG. 7
FIG. 8

LOAD CELL THAT IS SYMMETRICAL ABOUT A CENTRAL VERTICAL AXIS

BACKGROUND

The present invention relates to a load cell comprising a symmetrical mounting arrangement. More particularly, the invention relates to a load cell comprising a symmetrical mounting arrangement capable of mounting effect amelioration. The invention further relates to a weigh scale system comprising a load cell comprising a symmetrical mounting arrangement.

Typically load cells are mounted to a support structure in a scale system. The load cell is mounted to the support structure at its bottom or to one or more of its sides at one end of the load cell in a scale system. The loading fixture is mounted at the top or to one or more sides of the opposite end of the load cell. The load cell is made stiff at these ends to reduce distortion from so-called mounting and loading effects. A load cell is subject to "shear" when subjected to load changes such as is the case when loading the loading fixture of the load cell. This results in the so-called "loading effect". Shear results from the spring-like behaviour of load cells and the necessity of the load cell to deform in order to measure an applied load. As such, a load cell of finite stiffness must have spring-like behaviour, exhibiting deflection based on spring constants. A distorted data pattern can be the result of uncorrelated shear caused by forces other than the desired load, leading to inaccuracies in measurement data from the load cell. Previous attempts to control the loading effect have involved stiffening to reduce the uncorrelated shear of the load cell. Although performance is enhanced by the presence of stiffening, the solution involves increased material in the weigh scale and an increase in the cost of manufacture.

The so-called "mounting effect" can be seen as a result of mounting the load cell on the adjacent support structure and/or of mounting the loading fixture on the load cell. Bolts attaching the load cell to the attachments distort the load cell and cause output changes that are undetermined and that change with changes in load and temperature and even time.

These loading and mounting effects can be partially compensated for when the load cell is calibrated to make the load cell as accurate as possible in that configuration. However, the compensation is limited to lower accuracy load cells with poorer resolution, since these effects are undetermined and caused by unstable frictional joints.

The mounting and loading effects are only reduced by using a relatively stiff-ended load cell and through calibration of the scale system incorporating the load cell. As a result, the performance of the load cell is compromised. Particularly, for load cells wherein a lower resolution and accuracy is required, for example when between 500 to 10,000 unit divisions is required, controlling the stiffness of the load cell ends themselves may be deemed to be adequate. However, the desire to have higher resolution and accuracy, for example when between 25,000 and 100,000 unit divisions are required, as is the case for example in part counters and pharmaceutical scales, requires an improved solution than the reduction of the loading and mounting effects seen as a result of controlling the stiffness of the ends of the load cell.

SUMMARY

It is an aim of the present invention to overcome one or more of the above drawbacks associated with the prior art.

It is a further aim of the present invention to provide an improved load cell having higher resolution and accuracy when compared to the load cells described above.

In a first aspect, the present invention provides a load cell symmetrical about a central vertical axis and comprising first and second mounting surfaces, each on the same horizontal plane and configured for attachment to a support structure and to a loading fixture respectively.

In preferred embodiments, the load cell is longitudinally and transversely symmetrical respectively about a central longitudinal plane and a central transverse plane perpendicular to one another and transecting at the central vertical axis. In certain embodiments, the first and the second mounting surfaces are located at opposing ends of the load cell. More specifically, the mounting surfaces are located at opposing ends of the load cell and are equidistant the central vertical axis. Even more specifically, the mounting surfaces are located at opposing ends of the load cell and are equidistant the central vertical axis and are symmetrical thereabout.

The load cell may be of any suitable footprint. In preferred embodiments, the load cell is of rectangular footprint. The load cell may be oblong.

In embodiments of the invention the load cell is formed of a block of material.

The load cell may comprise one or more apertures therein. The size and shape of the apertures in the load cell may vary according to the application to which the load cell is directed.

In exemplary embodiments, the load cell may comprise a first loading member and a second loading member coupled together and capable of relative vertical deflection with respect to one another. The first and second mounting surfaces are preferably located in the same horizontal plane on the first and second loading members respectively. A first flexure element and a second flexure element are each coupled to the first and the second loading member and are arranged to deform in response to the relative deflection between the first and the second loading members.

It is much preferred that the first flexure element and the second flexure element are capable of symmetric deformation as a result of shear forces perpendicular to the mounting surfaces of the load cell in response to the relative vertical deflection between the first and the second loading members.

In embodiments, the load cell comprises one or more force responsive elements. The force responsive element may be any suitable member that may be engaged with a suitable measuring device operable to detect and measure the effect of shear force perpendicular to the mounting surfaces of the load cell resulting from the shear forces and/or differential bending moments attributable to a load applied to the load cell.

In embodiments, the load cell comprises one or more strain responsive elements. The strain responsive element may be any suitable deformable member that may be engaged with a suitable measuring device operable to detect and measure the effect of shear force perpendicular to the mounting surfaces of the load cell resulting from the shear forces and/or differential bending moments attributable to a load applied to the load cell.

In embodiments the strain responsive element is a structural member for mounting a displacement transducer. In such embodiments, the output of the displacement transducer is proportional to the load applied to the load cell.

In alternative embodiments, the strain responsive element may be a flexible member for mounting a strain gauge. More specifically, the strain responsive element may engage a plurality of strain gauges. Even more specifically, the strain responsive element may engage one or more pairs of strain gauges.

The strain responsive element preferably engages a pair of strain gauges.

The strain gauges are preferably affixed to the load cell. In this way, each strain gauge is located to detect deflection in the flexure element to which it is attached. As the flexure elements are deflected laterally in response to a load applied to the transducer, one of the strain gauges will be placed under tension and the other under compression. The outputs of the strain gauges are then electrically connected to form a half Wheatstone bridge arrangement the output of which is proportional to the deflection detected.

In preferred embodiments, the strain gauges are affixed to the inner surface of the first and the second flexure element respectively.

When a single strain gauge forms the strain responsive element, the output of same forms a quarter Wheatstone bridge. When a single pair of strain gauges forms the strain responsive element the output of same forms a half Wheatstone bridge. When the strain responsive element is formed of two pairs of strain gauges, the output of same will form a full Wheatstone bridge.

In embodiments of the invention, the strain gauge(s) is/are located such that, in use, the load cell is operable to detect a load caused by shear forces or differential bending moments applied to the load cell by detecting the shear force parallel to the mounting surfaces. More specifically, the load cell is operable to detect a load mounted on at least one of the mounting surfaces of the load cell.

The load cell may comprise mounting fixtures. More specifically, the load cell may comprise at least one mounting fixture in each of the first and the second mounting surfaces. It is much by preference that the mounting fixtures are symmetrical about the central vertical axis of the load cell. In preferred arrangements, a pair of mounting fixtures is located in each of the first and the second mounting surfaces.

In certain arrangements, the mounting fixtures are recesses in the material of the mounting surfaces of the load cell. More specifically, the mounting fixtures may be bolt-receiving recesses in the mounting surfaces of the load cell. Even more specifically, the mounting fixtures are threaded bolt holes in the mounting surfaces of the load cell.

By way of the mounting fixtures in the first mounting surface, the load cell is attachable to a support structure. By way of the mounting fixtures in the second mounting surface, the load cell is attachable to a loading fixture. A load to be applied to the load cell is located, directly or indirectly, on the loading fixture. In use, the load will cause shear forces and/or bending moments which are resolved by the load cell into shear forces parallel to the mounting surfaces. It is the shear forces which the strain gauges of the load cell detect and cause to be measured via an electrical output therefrom.

In a second aspect, the present invention provides a load cell attachment bracket for a symmetrical load cell, the bracket comprising a base portion and at least one side wall upstanding from the edge of the at least one base portion; at least one load cell attachment fixture located on the base portion and configured to facilitate attachment of the bracket to a load cell mounting fixture and at least one mounting element extending outwardly from the side wall configured to facilitate attachment of the bracket to a load bearing plate or a load cell support structure.

It is preferred that the footprint of the load cell attachment bracket is substantially equivalent to the footprint of a load cell to which the bracket is to be attached. In preferred arrangements, the load cell attachment bracket is of rectangular footprint.

In certain embodiments, the load cell attachment bracket comprises a rectangular base portion and four side walls each upstanding from an edge of the rectangular base portion.

In embodiments the base portion is formed of two base sections. The first base section is a plate; the second base section is formed of an aperture. More specifically, one half of the base portion forms the first base section and is located between the transverse midline of the bracket and the side wall at one end of the bracket. The other half of the base portion forms the second base section and is located between the transverse midline of the bracket and the side wall at the other end of the bracket.

The first base section may be recessed below the plane including the lower surfaces of each of the side walls of the bracket. More specifically, the first base section may be frustopyramidal. More specifically, the first base section is a plate formed in the shape of a pyramid with four sides and having the upper portion of the pyramid cut off by a plane parallel to the base. The cut off plane is the lowermost portion of the first base section.

In embodiments, the bracket comprises a plurality of load cell attachment fixtures. In preferred embodiments, the bracket comprises four load cell attachment fixtures.

It is much preferred that the attachment fixtures are positioned on the first base section. In embodiments, the load cell attachment fixtures are located on the lowermost planar portion of the first base section.

In embodiments of the invention, the load cell attachment brackets comprise at least one mounting element configured to facilitate attachment of the bracket to a load bearing plate or a load cell support structure.

In preferred embodiments, the load cell attachment bracket comprises a plurality of mounting elements.

The, or each, mounting element extends outwardly from the, or each, side wall of the bracket.

In embodiments wherein the bracket has a rectangular footprint, it is preferred that the bracket comprises three mounting elements. More specifically, the rectangular bracket, comprising four side walls comprises three mounting elements extending outwardly from three side walls of the bracket. Preferably two of the mounting elements, extend outwardly from opposing side walls and the third mounting element extends outwardly of the side wall located at the end of the bracket adjacent the second base section. In such embodiments, it is much preferred that the bracket is longitudinally symmetrical about a central longitudinal axis of the bracket.

In embodiments, the, or each, mounting element comprises an aperture. More specifically, the, or each, mounting element comprises an aperture having a threaded bore.

The, or each, mounting element is configured to receive an attachment fastener.

The, or each, attachment fastener may be a bolt, rivet, weld, adhesive or the like.

In certain embodiments, the, or each, mounting element may comprise a flexible decoupling element. The, or each, flexible decoupling element is/are operable to further reduce mounting stresses when the load cell attachment bracket is mounted to a load bearing plate or a load cell support structure. Such flexible decoupling elements are particularly advantageous when the load cell attachment bracket is to be attached to a load cell for use in a weigh scale requiring an extremely accurate measurement of load.

Preferably the load cell attachment bracket of the second aspect is attachable to a load cell according to the first aspect of the invention.

The load cell is preferably attached to the load cell attachment bracket by a coupling element. The coupling element may be attached to or through the, or each, load cell attachment fixture of the bracket and to or through a load cell mounting fixture of a load cell.

More specifically the coupling element may be one or more of a bolt, rivet, weld, adhesive or the like.

In preferred embodiments, the coupling element comprises a plurality of bolts.

Each bolt may be a threaded bolt securable to the load cell by a nut. More specifically the threaded bolt is securable to the load cell by a nut and locked into position by a further locking nut.

In a third aspect of the present invention there is provided a symmetrical load cell attachment bracket assembly comprising a pair of load cell attachment brackets combined together, one above the other in parallel orientation.

Preferably the symmetrical load cell attachment bracket assembly is formed by combining two identical load cell attachment brackets according to the second aspect of the invention together.

More specifically, a symmetrical load cell attachment bracket assembly is provided by two load cell attachment brackets as hereinabove described combined together, one above the other in parallel orientation. More specifically, the pair of load cell attachment brackets is combined together such that the second base section of a first load cell attachment bracket overlies the first base section of a second load cell attachment bracket and the first base section of a first load cell attachment bracket overlies the second base section of a second load cell attachment bracket. The load cell attachment bracket assembly is longitudinally symmetrical about the central longitudinal axis of the assembly.

In this way, a symmetrical load cell attachment bracket assembly is attachable to a symmetrical load cell by coupling elements attached to or through the, or each, load cell attachment fixture of each bracket and to or through each load cell mounting fixture of the load cell.

It is preferred that in the symmetrical load cell attachment bracket assembly, each load cell attachment bracket is in accordance with the second aspect of the invention. Further, it is preferred that the symmetrical load cell attachment bracket assembly is coupled to a load cell in accordance with the first aspect of the invention.

By providing a symmetrical load cell attachment bracket assembly attached to a symmetrical load cell, each according to the invention, various advantages are realised. For example, the load cell output is not affected by the mounting arrangement. The mounting effects are cancelled out by using symmetry of the load cell and in the mounting bracket so that the load cell performance is greatly unaffected by the mounting. An accuracy of between 5,000 to 25,000 divisions before calibration is readily achievable. For lower resolution requirements, the load cell of the first aspect of the invention requires only calibration for a specific design and not for each individual load cell. The load cell of the invention has symmetry both in function and in its mounting so that this cancellation of the so-called mounting effect is nearly complete to the tolerances of production processes and not limited by the material characteristics.

According to a fourth aspect of the present invention there is provided a load cell assembly comprising a load cell symmetrical about a central vertical axis and comprising first and second mounting surfaces each on the same horizontal plane and a plurality of load cell attachment brackets coupled to the load cell at the first and second mounting surfaces, wherein the load cell attachment brackets are configured for attachment to a support structure and to a loading fixture.

In preferred embodiments, the load cell assembly of the fourth aspect comprises a load cell according to the first aspect.

In preferred embodiments, the load cell assembly of the fourth aspect comprises a load cell attachment bracket according to the second aspect.

In much preferred embodiments, the load cell assembly comprises a symmetrical load cell bracket assembly according to the third aspect.

Features of one or more embodiments of the first, second, third and fourth aspects may be combined with one or more features of one or more other embodiments of the first, second and third aspects.

According to a fifth aspect of the present invention, there is provided a weigh scale comprising a load cell according to the first aspect of the invention coupled to a load cell attachment bracket assembly according to the third aspect of the invention and further comprising a load bearing structure coupled to the mounting elements of the pair of load cell attachment brackets.

The weigh scale may be a bench scale.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIGS. 6a and 6b depict symmetrical load cells according to yet further alternative embodiments of the first aspect of the invention;

FIG. 7 depicts a symmetrical load cell according to an embodiment of the first aspect of the invention having multiple mounting fixtures; and FIGS. 8a, 8b, 8c, show a load cell assembly according to an embodiment of the fourth aspect of the invention comprising a load cell bracket according to an embodiment of a second aspect of the invention, a load cell assembly according to an embodiment of the fourth aspect of the invention.

DESCRIPTION OF SOME EXEMPLARY EMBODIMENTS

Figure 1:
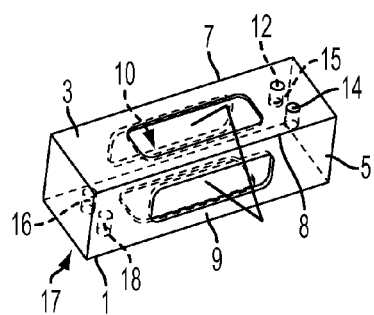
FIG. 1 shows a asymmetrical load cell according to the prior art.

While the invention is susceptible to various modifications and alternative forms, specific embodiments thereof are shown by way of example in the drawings and will herein be described in detail. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

Further, although the invention will be described in terms of specific embodiments, it will be understood that various elements of the specific embodiments of the invention will be applicable to all embodiments disclosed herein.

In the drawings, similar features are denoted by the same reference signs throughout.

Referring to FIG. 1 there is depicted a load cell 1 according to the prior art. The load cell 1 is formed of a substantially rectangular block of material comprising first and second loading members 3, 5 joined together by four flexure elements 7, 8, 9, 10. Although not shown in the depicted arrangement, at least some of the flexure elements will have a strain responsive element, such as a strain gauge, mounted thereon and configured to respond to the forces acting on the flexure elements of the load cell 1 when a load is applied thereto. The strain gauges (not shown) are electrically connected to an output circuit in the form of a Wheatstone bridge. The electrical output is then capable of being measured and the amplitude of the load calculated as a result. The electrical circuit, detection and measurement calculation apparatus are well known in the art and, as such, will not be described in further detail herein.

The load cell 1 further comprises mounting fixtures 12, 14 for a loading fixture located on the upper surface of the load cell 1. The mounting fixtures 12, 14 are threaded bore holes in the material of the load cell 1. The mounting fixtures 12, 14 are located at an end of the load cell 1 and provide a mounting surface 15 onto which a loading fixture may be attached. Attachment fixtures (not shown) in the form of threaded bolts are provided to attach a loading fixture (not shown) to the load cell 1 at the mounting fixtures 12, 14. The mounting surface 15 provides a horizontal surface onto which the loading fixture may be mounted.

Figure 3:
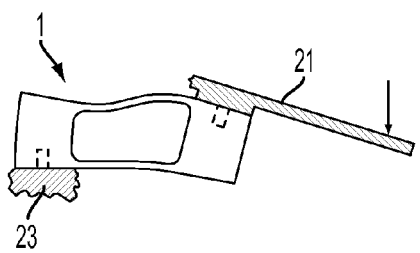
FIG. 3 depicts the asymmetrical load cell of FIG. 1 upon application of an eccentric load thereto.

The load cell 1 further comprises mounting fixtures 16, 18 for a support structure located on the lower surface of the load cell 1. The mounting fixtures 16, 18 are threaded bore holes in the material of the load cell 1. The mounting fixtures 16, 18 are located at an end of the load cell 1 and provide a mounting surface 17 onto which a support structure may be attached. Attachment fixtures (not shown) in the form of threaded bolts are provided to attach a support structure (not shown) to the load cell 1 at the mounting fixtures 16, 18. The mounting surface 17 provides a horizontal surface onto which the support structure may be mounted. Mounting surface 17 is parallel to mounting surface 15 and is located on the opposing surface of the load cell 1 at the opposite end to the mounting surface 17. As a result, an asymmetric load cell 1 is provided wherein the asymmetry is in the positioning of the mounting surfaces 15 and 17 relative to one another and the subsequent location of the loading fixture (21, FIG. 3) and the support structure (23, FIG. 3) when attached to the mounting fixtures.

An arrangement such as that depicted in FIG. 1 is prone to distortion due to the asymmetric attachments to the loading fixture and support structure resulting in output changes that are undetermined and that change with changes in load, temperature and even over time.

Figure 2:
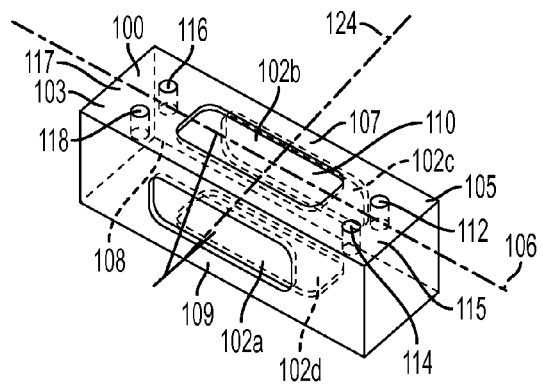
FIG. 2 depicts a symmetrical load cell according to an embodiment of the first aspect of the invention.

FIG. 2 depicts a load cell 100 in accordance with an embodiment of the first aspect of the present invention. The load cell 100 is formed of a substantially rectangular block of material comprising first and second loading members 103, 105 joined together by four flexure elements 107, 108, 109, 110. The load cell 100 comprises four apertures 102a, 102b, 102c, 102d in the material of the load cell 100. The apertures are symmetrical about the longitudinal central axis 106 of the load cell 100 and also about the transverse midline 124 of the load cell 100. In fact, the load cell 100 is symmetrical about axis 106 and about midline 124.

Although not shown in the depicted arrangement, at least some of the flexure elements can have a strain responsive element, such as a strain gauge, mounted thereon and configured to respond to the forces acting on the flexure elements of the load cell 100 when a load is applied thereto. The strain gauges (not shown) are electrically connected to an output circuit in the form of a Wheatstone bridge. The electrical output is then capable of being measured and the amplitude of the load calculated as a result. The electrical circuit, detection and measurement calculation apparatus are well known in the art and, as such, will not be described in further detail herein. Shear sensing means between loading members 103 and 105 may include shear bent beams in 102a and 102c, loading force sensors in 102b or 102d as designated in load cells 400 and 600 in FIG. 6a and FIG. 7.

The load cell 100 further comprises mounting fixtures 112, 114 for a loading fixture located on the upper surface of the load cell 100. The mounting fixtures 112, 114 are threaded bore holes in the material of the load cell 100. The mounting fixtures 112, 114 are located at an end of the load cell 100 and are provided in a horizontal mounting surface 115 onto which a loading fixture may be attached. Attachment fixtures (not shown) in the form of threaded bolts are provided to attach a loading fixture (not shown) to the load cell 100 at the mounting fixtures 112, 114. The mounting surface 115 provides a horizontal surface onto which the loading fixture may be mounted.

Figure 4:
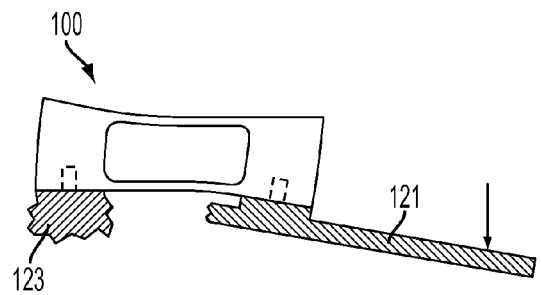
FIG. 4 depicts the symmetrical load cell of FIG. 2 upon application of an eccentric load thereto.

The load cell 100 further comprises mounting fixtures 116, 118 for a support structure located on the upper surface of the load cell 100. The mounting fixtures 116, 118 are threaded bore holes in the material of the load cell 100. The mounting fixtures 116, 118 are located at an end of the load cell 100 and are provided in a mounting surface 117 onto which a support structure may be attached. Attachment fixtures (not shown) in the form of threaded bolts are provided to attach a support structure (not shown) to the load cell 100 at the mounting fixtures 116, 118. The mounting surface 117 provides a horizontal surface onto which the support structure may be mounted in the same plane as horizontal mounting surface 115. Mounting surface 117 is parallel to mounting surface 115 and is located on the same surface of the load cell 100 at the opposite end to the mounting surface 117. As a result, a symmetric load cell 100 is provided wherein the symmetry is in the positioning of the mounting surfaces 115 and 117 relative to one another and the subsequent location of the loading fixture (121, FIG. 4) and the support structure (123, FIG. 4) when attached to the mounting fixtures.

The load cell 100 is symmetrical in its shape and also in its mounting fixtures 112, 114, 116, 118. In this way, the so-called mounting effects resulting when a load is applied to the load cell 100 are substantially reduced, if not obviated, such that the load cell performance is greatly unaffected by "load effects". As a result, a higher degree of accuracy in measuring the applied load is achieved than would be possible in an asymmetric load cell mounting arrangement.

Figure 5:
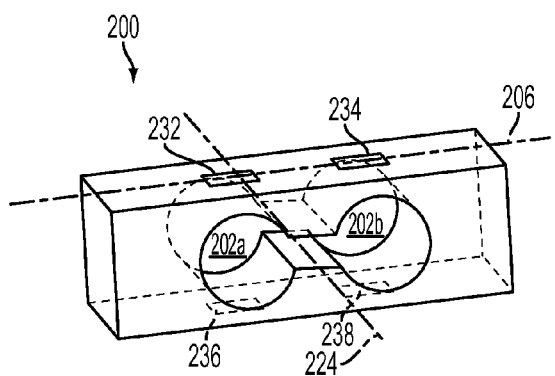
FIGS. 5a and 5b depict symmetrical load cells according to alternative embodiments of the first aspect of the invention.
Figure 5:
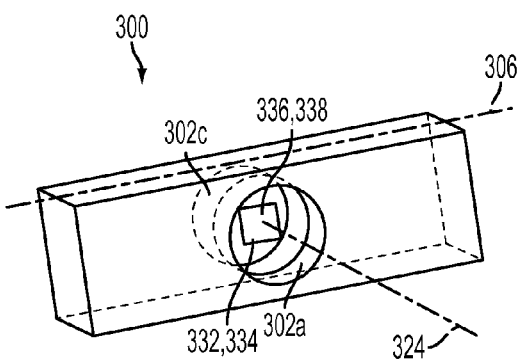

The load cells 200, 300, 400 and 500 of FIGS. 5 and 6 are various embodiments of a symmetrical load cell according to the first aspect of the present invention. Referring to FIG. 5*a*, load cell 200 comprises apertures 202*a* and 202*b* and mounting fixtures (not shown) similar to 112 and 116 in FIG. 2. The load cell 200 is longitudinally symmetrical about central longitudinal axis 206 and symmetrical about transverse midline 224. Apertures 202*a* and 202*b* are substantially circular in profile such that the load cell 200 is capable of resolving and measuring differential bending moments using strain gauges 232, 234, 236 and 238; resulting from the application of a load thereto. Referring to FIG. 5*b*, load cell 300 comprises aperture 302. The load cell 300 is longitudinally symmetrical about central longitudinal axis 306 and symmetrical about transverse midline 324. Apertures 302*a* and 302*c* are substantially circular in profile such that the load cell 300 is capable of resolving and measuring shear using strain gauges 332 and 334, in aperture 302*a* and strain gauges 336, and 338 in aperture 302*c*, resulting from the application of a load thereto.

Referring to FIG. 6*a*, load cell 400 comprises apertures 402*a*, 402*b* and 402*c* and mounting fixtures 412, 414, 416 and 418. The load cell 400 is longitudinally symmetrical about central longitudinal axis 406 and symmetrical about transverse midline 424. Apertures 402*a*, 402*b* and 402*c* are profiled and arranged such that the load cell 400 is capable of resolving and measuring reactive forces on force sensors 420 and 422 resulting from the shear bending of the vertical parallel beams 432 and 434 on application of a load thereto.

The forces on 420 and 422 are determined by measuring the periods of vibration and computing the applied load. This is well known in the art and will not be described in further detail herein.

Referring to FIG. 6*b*, load cell 500 comprises apertures 502*a*, 502*b* and 502*c* profiled and arranged such that the load cell 500 is capable of resolving and measuring reactive forces on force sensors 520 and 522 resulting from the shear bending of vertical parallel beams 532 and 534 on application of a load thereto. The load cell 500 is longitudinally symmetrical about central longitudinal axis 506 and symmetrical about transverse midline 524.

The load 600 of FIG. 7 differs from load cell 400 of FIG. 6*a* in that multiple mounting fixtures 612*a*, 614*a*, 616*a*, 618*a* and 612*b*, 614*b*, 616*b*, 618*b* are provided. Mounting surfaces 615*a* and 617*a* are provided on the upper surface of the load cell 600 and alternative mounting surfaces 615*b* and 617*b* are provided on the lower surface of the load cell 600. A loading fixture (not shown) and support structure (not shown) are mountable upon the mounting surfaces 615*a*, 617*a* or, alternatively on mounting surfaces 615*b*, 617*b*. The load cell 600 is longitudinally symmetrical about central longitudinal axis 606 and symmetrical about transverse midline 624.

FIGS. 8(*a*) to (*c*) show a load cell assembly 700, comprising two load cell attachment brackets 50*a*, 50*b* according to an embodiment of the second aspect of the present invention, and an attached load cell 400. The bracket 50 (when referring to bracket 50, this includes any one or both of brackets 50*a* and 50*b*) is configured for attachment to a load cell of the type depicted in FIGS. 2, 4, 5, 6 and 7. Bracket 50 comprises a base portion 52 formed of a first base section 52*a* and a second base section 52*b*. The first base section 52*a* is frustopyramidal in shape and comprises apertures 54 for receiving fasteners such as bolts or the like. Apertures 54 provide the load cell attachment fixtures of the bracket 50. The second base section 52*b* is formed of an aperture. Upstanding from the edges of base portion 52 are four side walls 56. Side walls 56 have a box-section.

Mounting elements 58 extend from three of the side walls 56 of bracket 50. The mounting elements 58 have a central aperture for receiving attachment fasteners (not shown). The attachment fasteners provide an attachment of a support structure and/or a loading fixture to the bracket 50. The mounting elements project outwardly from the side walls 56 from which they extend and are arranged such that the bracket is longitudinally symmetrical about a central longitudinal axis 60 of the bracket 50.

Figure 9:
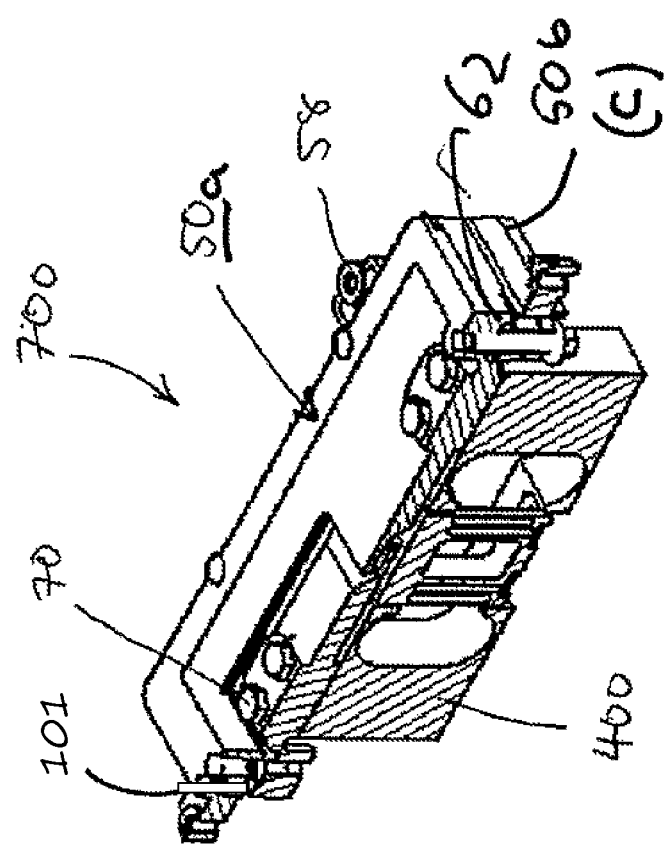
FIG. 9 depicts the load cell of FIGS. 8a-8c with a load limiting element 101 present in black-box format.

Apertures 62 in the side walls 56 are configured to receive load limiting elements (not shown in FIG. 8, but depicted in black-box format as element 101 in FIG. 9). A load cell attachment bracket assembly according to embodiments of the third aspect of the invention is formed by coupling a first attachment bracket 50*a* to an identical second attachment bracket 50*b* (not shown in particular). Load limiting elements are then inserted into apertures 62 to align the brackets 50*a*, 50*b* in position relative to one another. In such an assembly (not shown), the first attachment bracket 50*a* is aligned on top of a second attachment bracket 50*b* such that the first base section 52*a* of the first attachment bracket 50*a* is located in the second base section 52*b* of the second attachment bracket 50*b*. The brackets 50*a*, 50*b* are combined together in parallel relation one above the other in such an assembly.

The load cell assembly 700 shown in FIGS. 8*a* to 8*c* is according to an embodiment of the fourth aspect of the invention. Load cell attachment brackets 50*a* and 50*b* are coupled to load cell 400 (FIG. 6*a*) in the depicted arrangement. Bolts 70 attach the brackets 50*a* and 50*b* respectively to the mounting surfaces of load cell 400 through mounting fixtures 412, 414, 416 and 418. The assembly 700 is longitudinally symmetrical about the central longitudinal axis 60 of the assembly 700 and also about the transverse midline 724 of the assembly. This symmetry improves load cell rejection of output errors due to one or more of: thermal changes, eccentric loading conditions and load cell material characteristics making it more accurate and cost effective. The use of identical brackets 50*a* and 50*b* reduces cost. Provisions 72 and 74 are included in the brackets 50*a* and 50*b* for adjustments in load cell deflection limits. Three mounting elements 58 with apertures therein in each bracket 50*a* and 50*b* provide for more stable support and load effect stress with less dependence on the support and loading attachments to the brackets. Decoupling flexible elements, connecting mounting elements 58, are included in the three mounting elements of each bracket 50*a* and 50*b* to further reduce mounting stresses.

Various modifications are envisaged that are within the scope of the present invention as set forth in the appended claims. For example, the load cell may be of any suitable footprint. The load cell may be of circular footprint, for example. It should be understood that when the load cell is of circular footprint, a load cell attachment bracket of circular footprint is suitable for attachment to the load cell.

The load cell of the present invention is preferably symmetrical both in its shape and in its mounting attachments. That is to say, the load cell shape is symmetrical about its centre vertical axis and a load cell attachment bracket assembly coupled to the symmetrical load cell is also symmetrical about the central longitudinal axis of the resultant load cell assembly.

A pair of identical load cell attachment brackets according to the second aspect of the invention are combined together to form a longitudinally symmetrical load cell attachment bracket assembly. The symmetrical load cell attachment bracket assembly is coupleable to the symmetrical load cell at its mounting surfaces to provide identical brackets for mounting a load cell with symmetrical provisions for attachment to both a supporting structure and a loading fixture. The supporting structure is mounted to the load cell on the same side as the loading fixture mounting. In this way, symmetrical stresses from various attachment fasteners as well as from loading effects caused by eccentric load positions are cancelled out by the configuration of the load cell assembly. In this way, the various forces acting on the load cell are resolved such that the strain or force responsive element(s) of the load cell are sensing relative shear forces acting on them.

The thermal effects and end portion bending effect stresses on the attachment fixtures and load cell respectively are cancelled out by the symmetrical configuration of the load cell assembly.

The invention claimed is:

1. A load cell assembly comprising only one load cell symmetrical about a central vertical axis and comprising first and second mounting surfaces each on the same horizontal plane; and
    a plurality of load cell attachment brackets coupled to the load cell at the first and second mounting surfaces, wherein the load cell attachment brackets are configured for attachment to a support structure and to a loading fixture, wherein at least one of:
    the plurality of load cell attachment brackets are arrayed one above the other, and the plurality of load cell attachment brackets are arranged above the only one load cell; or
    the plurality of load cell attachment brackets have a longitudinal axis extending in a same direction as the only one load cell.

2. A weigh scale comprising a load cell symmetrical about a central vertical axis and comprising first and second mounting surfaces, each on the same horizontal plane and configured for attachment to a support structure and to a loading fixture respectively, the load cell coupled to a load cell attachment bracket assembly comprising a pair of load cell attachment brackets each having mounting elements, wherein each of the load cell attachment brackets extend, with respect to a longitudinal axis of the load cell, from the first mounting surface to beyond the second mounting surface.

3. A load cell assembly comprising a load cell symmetrical about a central vertical axis and comprising first and second mounting surfaces each on the same horizontal plane; and
    a plurality of load cell attachment brackets coupled to the load cell at the first and second mounting surfaces, wherein the load cell attachment brackets are configured for attachment to a support structure and to a loading fixture, wherein
    the plurality of load cell attachment brackets are arrayed one above the other, and the plurality of load cell attachment brackets are arranged above the load cell.

4. A load cell assembly according to claim 3 wherein the mounting surfaces are located at opposing ends of the load cell and are equidistant the central vertical axis.

5. A load cell assembly according to claim 3 wherein the mounting surfaces are located at opposing ends of the load cell and are equidistant the central vertical axis and are symmetrical thereabout.

6. A load cell assembly according to claim 3 wherein the load cell is formed of a block of material.

7. A load cell assembly according to claim 3 wherein the load cell comprises one or more apertures therein.

8. A load cell assembly according to claim 3 wherein the load cell comprises a first loading member and a second loading member coupled together and capable of relative vertical deflection with respect to one another.

9. A load cell assembly according to claim 8 wherein the first and second mounting surfaces are located in the same horizontal plane on the first and second loading members respectively.

10. A load cell assembly according to claim 8 wherein a first flexure element and a second flexure element are each coupled to the first and the second loading member and are arranged to deform in response to the relative deflection between the first and the second loading members.

11. A load cell assembly according to claim 10 wherein the first flexure element and the second flexure element are capable of symmetric deformation as a result of shear forces perpendicular to the mounting surfaces of the load cell in response to the relative vertical deflection between the first and the second loading members.

12. A load cell assembly according to claim 3 wherein the load cell comprises one or more force responsive elements.

13. A load cell assembly according to claim 12 wherein the force responsive element is engagable with a suitable measuring device operable to detect and measure the effect of shear force perpendicular to the mounting surfaces of the load cell resulting from the shear forces and/or differential bending moments attributable to a load applied to the load cell.

14. A load cell assembly according to claim 3 wherein the load cell comprises one or more strain responsive elements.

15. A load cell assembly according to claim 14 wherein the strain responsive element is engagable with a suitable measuring device operable to detect and measure the effect of shear force perpendicular to the mounting surfaces of the load cell resulting from the shear forces and/or differential bending moments attributable to a load applied to the load cell.

16. A load cell assembly according to claim 15 wherein the strain responsive element is a structural member for mounting a displacement transducer.

17. A load cell assembly according to claim 14 wherein the strain responsive elements are strain gauges that are affixed to the load cell.

18. A load cell assembly according to claim 10 wherein strain gauges are affixed to the inner surface of the first and the second flexure element respectively.

19. A load cell assembly according to claim 14 wherein the strain responsive elements are strain gauge(s) located such that, in use, the load cell is operable to detect a load caused by shear forces or differential bending moments applied to the load cell by detecting the shear force perpendicular to the mounting surfaces.

20. A load cell assembly according to claim 1 wherein the load cell comprises mounting fixtures.

21. A load cell assembly according to claim 20 wherein the load cell comprises at least one mounting fixture in each of the first and the second mounting surfaces.

22. A load cell assembly according to claim 20 wherein the mounting fixtures are symmetrical about the central vertical axis of the load cell.

23. A load cell assembly according to claim 20 wherein a pair of mounting fixtures is located in each of the first and the second mounting surfaces.

24. A weigh scale comprising a load cell assembly according to claim 1, wherein each of the load cell attachment brackets are identical.

25. A weigh scale comprising a load cell assembly according to claim 1, wherein each of the load cell attachment brackets extend, with respect to a longitudinal axis of the load cell and with respect to a direction normal to the longitudinal direction of the load cell, beyond the outer periphery of the load cell.

26. A weigh scale comprising a load cell assembly according to claim 1, wherein respective load limiting elements are located in respective alignment apertures extending from a first of the load cell attachment brackets to a second of the load cell attachment brackets.

27. A weigh scale according to claim 2, wherein each of the load cell attachment brackets of the pair are identical.

28. A load cell assembly according to claim 1 wherein the plurality of load cell attachment brackets have a longitudinal axis extending in the same direction as the only one load cell.

29. A load cell assembly according to claim 1 wherein the plurality of load cell attachment brackets have a foot print that extends beyond all sides of the only one load cell when viewed from a direction where the load cell attachment brackets are interposed between the load cell.

30. A load cell assembly according to claim 3 wherein the plurality of load cell attachment brackets have a longitudinal axis extending in a same direction as the load cell.

31. A weigh scale including a load cell assembly according to claim 3, wherein the weigh scale is a bench scale.

32. The load cell assembly of claim 3, wherein the load cell includes a first through passage extending from a first side of the load cell to a second side of the load cell, the second side of the load cell opposite the first side of the load cell, and a second through passage extending from a third side of the load cell to a fourth side of the load cell, the fourth side opposite the second side, wherein the first and second through passages extend in a direction normal to the length direction, and wherein the first and second passages meet each other such that a through passage extends from the first side to the fourth side and a through passage extends from the second side to the third side.

* * * * *